(12) United States Patent
Poliakov

(10) Patent No.: US 11,275,841 B2
(45) Date of Patent: Mar. 15, 2022

(54) COMBINATION OF PROTECTION MEASURES FOR ARTIFICIAL INTELLIGENCE APPLICATIONS AGAINST ARTIFICIAL INTELLIGENCE ATTACKS

(71) Applicant: Adversa AI LTD, Tel Aviv (IL)

(72) Inventor: Aleksandr Poliakov, Haifa (IL)

(73) Assignee: ADVERSA AI LTD, Tel Aviv (IL)

( * ) Notice: Subject to any disclaimer, the term of this patent is extended or adjusted under 35 U.S.C. 154(b) by 216 days.

(21) Appl. No.: 16/565,435

(22) Filed: Sep. 9, 2019

(65) Prior Publication Data
US 2020/0082097 A1    Mar. 12, 2020

Related U.S. Application Data

(60) Provisional application No. 62/730,041, filed on Sep. 12, 2018.

(51) Int. Cl.
*G06F 21/57* (2013.01)
*G06F 16/951* (2019.01)
*G06K 9/62* (2022.01)

(52) U.S. Cl.
CPC .......... *G06F 21/577* (2013.01); *G06F 16/951* (2019.01); *G06K 9/6267* (2013.01); *G06K 9/6268* (2013.01); *G06F 2221/033* (2013.01)

(58) Field of Classification Search
CPC ....... G06F 21/32; H04R 1/1091; G10L 25/60; G10L 25/51; G06K 9/00885; G07C 9/37
See application file for complete search history.

(56) References Cited

U.S. PATENT DOCUMENTS 8,856,869 B1 * 10/2014 Brinskelle ........... G06F 21/6218
726/2
2017/0244746 A1 * 8/2017 Hawthorn ............... G06F 21/55

OTHER PUBLICATIONS

Fredrikson, M. et al., "Model Inversion Attacks that Exploit Confidence Information and Basic Countermeasures"; CCS (2015); 12 pgs.
Papernot, N. et al., "Practical Black-Box Attacks against Machine Learning"; ASIA CCS (2017), Abu Dhabi, United Arab Emirates; 14 pgs.
Weng, T. et al., "Evaluating the Robustness of Neural Networks: An Extreme Value Theory Approach"; ICLR (2018); 18 pgs.

* cited by examiner

*Primary Examiner* — Meng Li
(74) *Attorney, Agent, or Firm* — Intelletek Law Group, PLLC; Gabriel Daniel, Esq.

(57) ABSTRACT

A method and system of protecting an artificial intelligence (AI) application are provided. Parameters of the AI application are identified. An assessment of a vulnerability of the AI application is performed, including: applying a combination of protection measures comprising two or more protection measures against at least two different attacks and at least one dataset, and determining whether the combination of protection measures is successful in defending the AI application. A target configuration of an AI model to protect the AI application is determined based on the assessed vulnerability of the AI application. An AI enhanced algorithm is determined to adjust the AI model to include a combination of most computationally efficient defenses based on the target configuration. The adjusted AI model is used to protect the AI application.

18 Claims, 6 Drawing Sheets

| Category | Defense Subcategory | Functions/Features |
|---|---|---|
| Predict | Modified Training | Collects all defenses that somehow modify the training procedure to minimize the chances of potential attacks |
| | Verification | Health-check to explore all potential ways to attack a model and then present the worst-case scenarios that may occur |
| Prevent | Modified Input | Collects all defenses, which modify inputs to corrupt or smooth objects (e.g., images) in such a way that adversarial modifications cannot be detected by a victim model. It can be compression, purification, randomization, etc. In many application domains, there are verifiable properties of inputs that should not be violated in practice. |
| | Modified Model | Collects all defenses, which modify a machine learning model. This can be modification of hyperparameters or activaton functions, adding new layers or combining ultiple models together. |
| Detect | Supervised Detection | Collects all defenses, which can detect potential attacks on a ML models. The system is trained not only to achieve the initial goal but also to separate unusual from usual inputs. Methods are diverse by quality and speed |
| | Unsupervised Detection | Collects all defenses, which can detect potential attacks on ML models without initial training. The system analyzes behavior online, learns behavior from all inputs and detects outliers. Many ML methods of anomaly detection can be applied here with different modifications. |
| Respond | Retraining | Collects all defenses, which respond to potential attacks by detecting outliers and deleting them from training in order to save a model from retraining and poisoning attacks |
| | Counterattack | Collects all defenses, which respond to potential attacks by detecting attack attempts and replying in such a way that attacks will continue in the wrong direction. |

| Name | Category | Subcategory |
|---|---|---|
| Adversarial Training | Predict | Modified Training |
| Regularization | Predict | Modified Training |
| Distillation | Predict | Modified Training |
| Reconstruction | Prevent | Modified Input |
| Foveation | Prevent | Modified Input |
| Compression | Prevent | Modified Input |
| Purification | Prevent | Modified Input |
| Randomization | Prevent | Modified Input |
| Activation Functions | Prevent | Modified Model |
| Layers | Prevent | Modified Model |
| Add-ons | Prevent | Modified Model |
| Loss Function | Prevent | Modified model |

| Type of Data | Example Scenario |
|---|---|
| Voice | Target AI application works with voice data |
| Image | Target AI application works with image data such as face recognition, image classification, etc. |
| Text | Target AI application works with text data, such as sentiment analysis or translation |
| Video | Target AI application works with video data |
| File | Target AI application works with files such as malware detection |
| 3D Object | Target AI application works with 3d objects |
| Combination | Adversarial attack is applicable to one or more types |

FIG. 4B

COMBINATION OF PROTECTION MEASURES FOR ARTIFICIAL INTELLIGENCE APPLICATIONS AGAINST ARTIFICIAL INTELLIGENCE ATTACKS

CROSS-REFERENCE TO RELATED APPLICATION

The present application claims the benefit of priority under 35 U.S.C. § 119 from U.S. Provisional Patent Application Ser. No. 62/730,041 entitled "Methods of Evaluating Best Combinations of Protection Measures for AI Models Against AI Attacks," filed on Sep. 12, 2018, which is hereby incorporated by reference in its entirety for all purposes.

BACKGROUND

Technical Field

The present disclosure generally relates to computer systems, and more particularly, to identify protection measures for Artificial Intelligence (AI) systems.

Description of the Related Art

Machine learning (ML) is a subfield of computer science that evolved from the study of pattern recognition and computational learning theory in artificial intelligence. Today, ML is increasingly used to construct algorithms that can learn from and make predictions based on reference data. These ML algorithms are used in an ever-increasing number of applications, including facial recognition, medical diagnoses, autonomous vehicles, access control, etc. Recent studies have shown that machine learning classifiers can be deceived to provide incorrect predictions. As the number of systems that use such AI increase and are used in security sensitive areas, the safety of such AI systems is of growing concern. Indeed, by at least one calculation more than 300 research papers have been devoted to cover different concerns regarding approaches to AI system protection.

SUMMARY

According to various embodiments, a computing device, a non-transitory computer readable storage medium, and a method of protecting an artificial intelligence (AI) application are provided. Parameters of the AI application are identified. An assessment of a vulnerability of the AI application is performed, including: applying a combination of protection measures comprising two or more protection measures against at least two different attacks and at least one dataset, and determining whether the combination of protection measures is successful in defending the AI application.

In one embodiment, a machine learning algorithm is used to adjust the AI model to include a combination of most computationally efficient defenses based on the target configuration. The adjusted AI model to protect the AI application.

In one embodiment, for each of the at least two different attacks, a goal of the attack is received from at least one of an administrator or user of the AI application.

In one embodiment, the goal of the AI application is automatically determined by the computer by reviewing the AI application.

In one embodiment, the goal of the AI application is received by the computer from at least one of an administrator or user of the AI application.

In one embodiment, the target configuration is based on metrics of the ML model, including at least one of: accuracy, F1 score, F2 score, false positive rate, false negative rate, false sensitivity rate, empirical robustness, Cross Lipshitz Extreme Value (CLEVER) score, Misclassification Ratio (MR), Classification Rectify Ratio (CRR), Classification Sacrifice Ratio (CSR), Classification Confidence Variance (CCV), Classification Output Stability (COS), Average Confidence of Adversarial Class (ACAC), Average Confidence of True Class (ACTC), Average Lp Distortion (ALDp), Average Structural Similarity (ASS), Perturbation Sensitivity Distance (PSD), Noise Tolerance Estimation (NTE), Robustness to Gaussian Blur (RGB), or Robustness to Image Compression (RIC).

In one embodiment, a pre-optimization algorithm is used to optimize a number of attacks and a number of defenses to be used in the combination of protection measures, based on at least one of a goal of the attack, a mindmap of the attack, and an expected time of the attack.

In one embodiment, an on-demand optimization algorithm is used to exclude an attack, a defense, or dataset from the combination of protection measures, if the corresponding attack, defense, or dataset does not perform according to its corresponding metric.

In one embodiment, the target configuration is based on a defense category of the AI model.

In one embodiment, updating the assessment of the vulnerability of the AI application includes tracking one or more databases for documents of protection measures or defenses, by way of one or more crawlers.

In one embodiment, updating the assessment of the vulnerability of the AI application further includes, for each document, tagging parameters of the document, including at least one of a defense configuration, goal configuration, target configuration, or metric configuration, by way of a text classification algorithm.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 3 provides a table of an example list of hyperparameter options to choose from.

FIG. 4A illustrates an example table of different categories and subcategories for different functions of defenses.

FIG. 4B illustrates an example table of different types of data that can be identified by a target configuration submodule.

DETAILED DESCRIPTION

Overview

Figure 1:
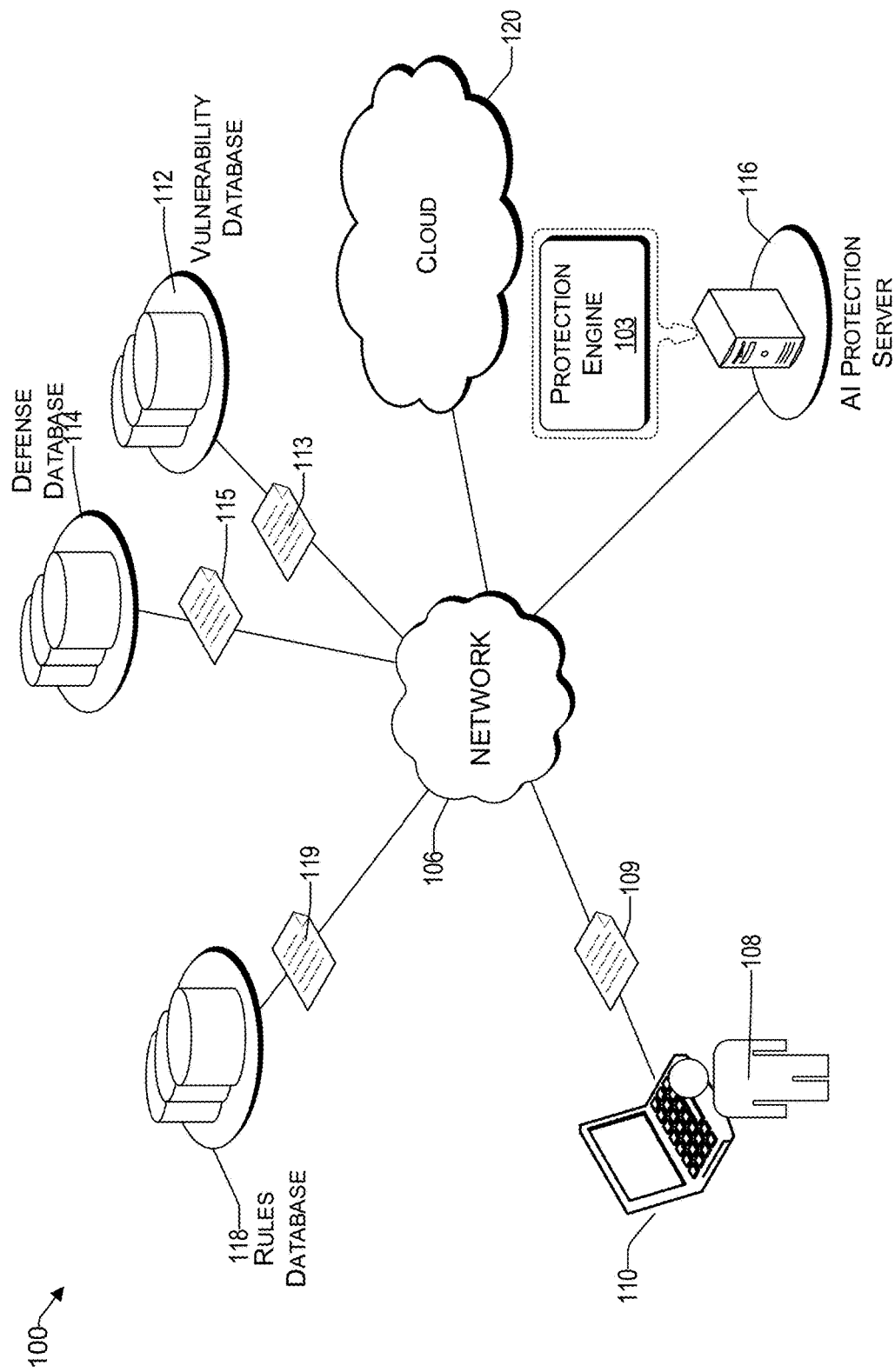
FIG. 1 illustrates an example architecture of an artificial intelligence application protection system, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to systems and computerized methods of identifying an effective combination of protection measures for AI technology. The fast-paced growth in AI technology generally relates to improving its capability to perform increasingly advanced functions, but has lacked in in focus in security measures, making many AI platforms poor stewards of sensitive data. That is because ML models are not immune to synthetically created inputs that can fool AI technology, referred to herein as adversarial attacks. ML algorithms to develop the models can accept numeric vectors as inputs. These inputs can be configured in a specific way to generate a wrong result from the ML model. For example, ML models include transformations that can be sensitive to changes in the input. These sensitivities can be exploited to modify the ML model's behavior, resulting an AI security threat.

Today, there is no lack of examples of such adversarial attacks. For instance, autonomous vehicles can be fooled to misinterpret stop signs or speed limits. Facial recognition can be bypassed (e.g., in ATMs that use face recognition as an additional security measure). Spam filters can be bypassed. Sentiment analysis of movie reviews, hotels etc. can be manipulated. Indeed, systems that automatically provide a rating to a particular comment have been demonstrated to be tricked (e.g., a negative comment was able to be interpreted as a positive one). Further, anomaly detection engines can be bypassed and voice commands can be faked (e.g., a chatbot could recognize a malicious background noise as a command that may not be recognized by a human ear).

The adversarial attacks are described herein in the context of three major categories, namely (i) privacy attacks, (ii) poisoning, and (iii) evasion, each discussed below at a high level.

In a privacy attack, the goal of an attacker, sometimes referred to herein as a malicious party, is to gain some knowledge of the ML model (sometimes referred to herein as an AI application), which the malicious party can use for their own gain or advance further attacks. When dealing with an ML model, such as an image recognition engine, it is effective to explore its internals. For example, in recent model inversion attack sensitive attribute values of a target user were attempted to be inferred.

Other privacy attacks relate to sensitive data, where it is possible to maliciously retrieve information about a dataset. For example, consider a particular example that is part of a training dataset that includes an adversarial attack, which could affect a membership inference. Further, there is a potential for discovering information about general attributes of a training dataset, as if particular human races were in the training dataset with the help of an attribute inference attack. Such inference attack is a data mining technique performed by analyzing data in order to maliciously gain knowledge about a subject or database. In this way, a subject's sensitive information can be leaked if a malicious party can infer its value with sufficient confidence, thereby presenting a security concern.

As used herein, in poisoning the goal of a malicious party is to retrain an AI application so that the AI application would respond to input parameters in the way desired by the malicious party. There are various examples of poisoning, which can be divided into three main categories.

In a first category, black-box poisoning, or real poisoning, a malicious party (e.g., hacker) has only API access to an ML model.

In a second category, grey-box poisoning, or trojaning, the malicious party may only have access to an ML model, not a training dataset, and may desire to retrain the ML model so that it will operate in particular situations in a predetermined way.

In a third category, white-box poisoning, or backdooring, a malicious party may have a training dataset and a model and may desire to inject some behavior, which will remain in the AI application even if the network is retrained.

In a third category of adversarial attack, evasion, tasks in ML are misclassified. For example, an AI application wrongly recognizes a cat in the picture, while in fact it is an apple. Evasion adversarial attacks may include, without limitation, Fast Gradient Step Method (FGSM), Basic Iterative Method (BIM), Jacobian-Based Saliency Map (JSMA), and Carlini & Wagner (C&W), to name a few.

Adversarial attacks can be performed in different ways. For example, they can be non-targeted and targeted. Non-targeted is the more general type of attack, where the classifier is maliciously induced to provide an incorrect result. In contrast, a targeted adversarial attack aims to receive a particular class for an input.

Like in any type of adversarial attack, a malicious party may have different restrictions in terms of knowledge of a targeted system. In case of a full black-box method, an attacker can send some information to a system and obtain a simple result. As for a grey-box method, an attacker may know details about a type of neural network, its structure, the number of layers etc. As to a white-box method, it refers to a situation where much is known about the network including all weights and data, on which the network was trained. A white-box attack should not be considered as a real attack vector but as a proof of concept or a way to assess the quality of the system before production.

There are different approaches to AI application protection. These are divided herein into four main categories, namely (i) predictive, (ii) preventive, (iii) detective, and (iv) responsive, each of which may be separated into subcategories. For example, methods of the predictive category imply a model protection before production and include two main approaches: (i) modified training and (ii) verification. The preventive category introduces approaches that focus on preventing attacks during production by modifying an input or a model such that the model will react in a specific way against adversarial attacks. The detecting category relates to adversarial detection. Methods of this category help identify an adversarial input and do not let such data into a model— with an add-on model or by putting adversarial inputs into a new category. The fourth category (i.e., responsive) includes methods that can provide active reaction to attacks, such as modification of an AI application responses when an attack is detected working in combination with defenses from the previous—detecting category. Generally, these categories of AI application protection may form over 100 methods, but in most cases, they may not adequately protect from advanced attacks, or they may be specific to a particular AI solution.

What is provided herein are methods and systems of implementing optimization techniques and machine learning approaches to find the most computational resource effective protection mechanism for an AI application. In one aspect, various combination of defenses are evaluated by way of optimization techniques. The results of the different combination of defenses are provided as a training set to a solver runner. This solver runner is trained based on the data generated by the evaluation of the different combination of defenses and provides the best combination of defense measures tested on various attack and defense scenarios to generate a most protected AI application for a particular goal. By way of not limiting example, the goal can be to protect from all threats or from one particular threat, but with no or minimal quality reduction for the AI application. For example, some defenses may reduce the quality of AI application such as accuracy. Accordingly, protection from adversarial attacks may involve accuracy degradation on normal inputs. In one aspect, the teachings herein make this degradation as small as possible.

In one embodiment, the system discussed herein is able to automatically search for new types of attacks and defenses. Such search may be performed by automatic or semi-automatic analysis of research papers by way of machine learning algorithms of classification. New attacks may be added to the system automatically, as well as the results (e.g., performance metrics on default datasets). In one embodiment, subscribes of the system discussed herein are sent notifications including the latest approaches to defending their AI application.

Reference now is made in detail to the examples illustrated in the accompanying drawings and discussed below.

Example Architecture

FIG. 1 illustrates an example architecture 100 of an AI application protection system, consistent with an illustrative embodiment. Architecture 100 may include a vulnerability database 12, a defense database 114, and a rules database 118. The architecture 100 includes an AI protection server 116 that hosts a protection engine 103. There is a network that 106 allows the protection engine 103 to communicate with various resources connected to the network 106, such as the vulnerability database 112, defense database 114, rules database 118, and users and/or administrators 108 connected to the network 106 via a computing device 110 of a user, developer or administrator 108 of the AI application. The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, that provides various ancillary services, such as communication with various databases, users, administrators, the Internet, and the cloud 120.

The vulnerability database 112 is configured to store and maintain an up-to-date list of present AI system security concerns. For example, the vulnerability database 112 may be maintained by a security software company or a consortium of organizations and/or individuals interested in AI system security. Accordingly, the vulnerability database 112 may provide the protection engine 103 an updated list of security concerns 113 in the form of a data packet, at predetermined intervals or upon a trigger event. The security concerns may be descriptions of the security concerns or the actual code thereof. In various embodiments, the security concerns 113 may be based on region, network, group, and/or overall threat level climate.

The defense database 114 represents one or more databases that provide solutions, sometimes referred to herein as defenses 115, to different AI security vulnerabilities. Stated differently, the defense database 114 is a source of different solutions that may be applied to one or more AI application security attacks. To that end, the protection engine 103 identifies parameters of an AI application 109 running on a computing device 110, at predetermined intervals or upon a trigger event (e.g., a new AI application becoming available or a new security concern 113 being identified by the vulnerability database 112).

In one embodiment, there is a rules database 118 that is operative to provide the goal (e.g., purpose) of an AI application to the protection engine 103 by way of a data packet 119 sent over the network 106.

It will be understood that the sheer volume of different security concerns 113 and combination of defenses that may be applied towards the security concerns 113 may provide a technical challenge for not only the network 106, but also the computing resources of the AI protection server 116 hosting the protection engine 103, including processing time and memory resources of the AI protection server 116. In this regard, the protection engine 103 is configured to substantially reduce the number of combination of defenses and infer the effectiveness of a defense or combination of defenses that are not evaluated, discussed in more detail later. In this way, a technical effect of conserving valuable network resources 106, as well as computing and storage resources of the AI protection server 116 are achieved. By virtue of limiting the computation to a reduced pool of permutations, the computational demand on the AI protection server 116 is conserved, thereby providing a more efficient computational platform.

While the vulnerability database 112, defense database 114, rules database 118, and the AI protection server 116 are illustrated by way of example to be on different platforms, it will be understood that, in various embodiments, these platforms may be combined in various combinations. In other embodiments, one or more of these computing platforms may be implemented by virtual computing devices in the form of virtual machines or software containers that are hosted in the cloud 120, thereby providing an elastic architecture for processing and storage.

Example Block Diagram

Figure 2:
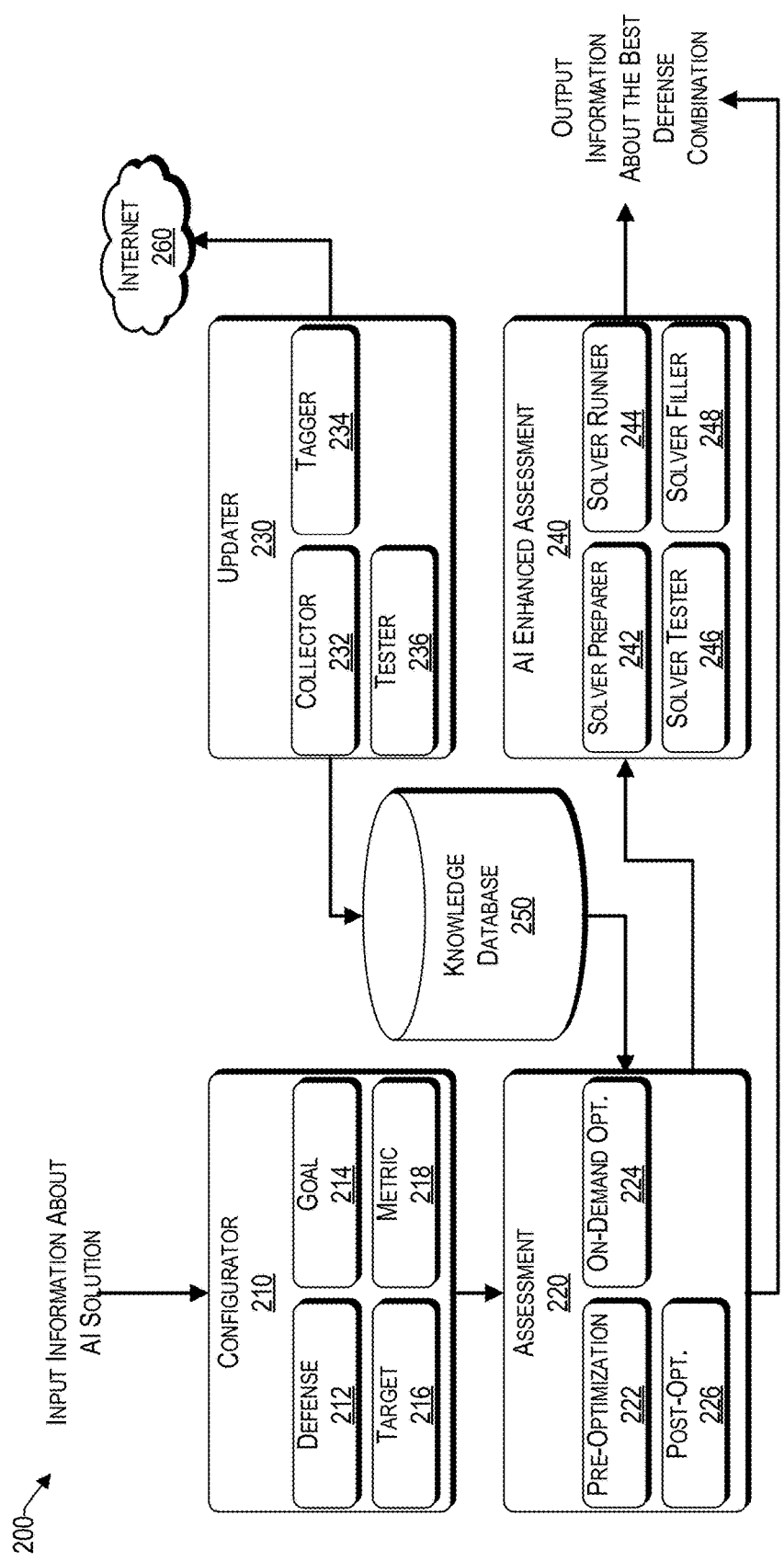
FIG. 2 illustrates a conceptual block diagram of a protection engine, consistent with an illustrative embodiment.

FIG. 2 illustrates a conceptual block diagram of a protection engine 200, consistent with an illustrative embodiment. The example protection engine 200 includes a configurator module 210, assessment module 220, updater module 230, and an AI enhanced assessment module 240. In one embodiment, there is a knowledge database 250 representing at least one of the rules database 118, defense database 114, or vulnerability database 112 of FIG. 1.

The configurator module 210 provides a configuration of the parameters of a solution to protect an AI application. To that end, the configurator module 210 may involve several submodules. For example, the configurator module 210 may include a defense configuration 212, goal configuration 214, target configuration 216, and metric submodule 218, each described in more detail below.

To provide the most effective defense for an AI application (sometimes referred to herein as a "target ML model"), the defense configuration module 212 evaluates different defense options. For example, the protection engine 200 can choose a particular predetermined defense for a category or subcategory, or give the protection engine 200 an opportunity to form its own combination of various defenses for each category by way of the defense module 212. In one embodiment, the protection engine 200 can choose a maximum number of various defenses in each category that will work simultaneously (e.g., concurrently). If the protection engine 200 chooses different defenses in a category, the protection engine 200 can also decide on the way these defenses will be combined together (e.g., stacking, begging or boosting). In addition, the protection engine 200 may test multiple hyperparameters of each defense 212. FIG. 3 provides a table of an example non-limiting list of options to choose from.

Referring back to FIG. 2, in one embodiment, there is a defense type, which provides a more detailed division of defenses that follows a subcategory. While a subcategory may be responsible for a general approach and explain what can be performed to protect an AI application, the defense type is responsible for the particular method and can explain how the protection is implemented. In this regard, reference now is made to FIG. 4A, which illustrates an example non-limiting table 400A of different categories and subcategories for different functions. For example, table 400A can be used to generate a list of defenses to adversarial attacks and different combinations of defenses thereof.

Referring back to FIG. 2, the goal configuration submodule 214 of the configurator module 210, can determine a goal of the attack. For example, after configuring inputs (e.g., different types of defenses), the protection engine 200 identifies threats from which to protect the AI system (e.g., target AI application). For example, the adversarial attack may relate to espionage, sabotage, fraud, etc. For each adversarial attack, the protection engine 200 select a category therefor. For example, for fraud, the protection engine 200 may choose an evasion attack. For this evasion attack, the protection engine 200 may further narrow down the choice to only white-box attacks. In each category, in various embodiments, the protection engine 200 may select some attacks or select all, such that the system tests an AI application with all possible defenses. Some configuration outputs are discussed below.

In the present discussion, attacks are divided into a triad of (i) confidentiality, (ii) availability, and (iii) integrity. For example, for espionage, the objective (sometimes referred to herein as the goal or purpose) of the adversarial attack may be to glean insight into the AI application and utilize the received information, or plot a more advanced attack based on the gleaned insight. Stated differently, a malicious party may interact with an AI application, for example, an image recognition engine, in order to drill down and explore the internals, such as the training dataset of the AI application.

In sabotage, the objective of the adversarial attack may be to disable functionality of an AI application. As to AI fraud, it represents misclassifying tasks. By way of a simple non-limiting example, an AI system (e.g., autonomous vehicle) is led to mistakenly interpret a vehicle on the road to be a cat.

The goal configuration submodule 214 can also determine whether the adversarial attack is related to specificity. Consider a malicious party having the goal of misclassifying results. For example, the goal may be to bypass an access control system that rejects all employees except top management, or avoid identification of an individual by an AI image recognition system. The adversarial attack may relate to confidence reduction, where the class is not changed but substantially impacts the confidence in the classification. The adversarial attack may relate to misclassification where a class is changed without any specific target. The adversarial attack may relate to a targeted misclassification, where a class is changed to a particular target. Further, the adversarial attack may be a source/target misclassification, where a particular source is changed to another target.

In one embodiment, the goal configuration submodule 214 determines whether the adversarial attack is related to perturbation, which describes the versatility of an adversarial attack for different inputs. For example, if an attacker (e.g., adversarial party) is able to bypass a facial recognition system, the protection engine 200 can assign the attacker (e.g., adversarial party) glasses (e.g., sunglasses may have a particular visual pattern that can fool a face recognition system). While the perturbation may be multi-purpose, the protection engine 103 is able to create glasses to spoof the facial recognition system (e.g., no matter who wears them). In various scenarios, the adversarial perturbation can be for a particular individual or be universal (e.g., applicable to many subjects).

In one embodiment, the goal configuration submodule 214 identifies an environment of an adversarial party. For example, if an adversarial party has a digital photo (e.g., their profile picture) which is used make small perturbations to multiple pixels, such digital photo may be able to fool a facial recognition system in the digital world so that an AI image recognition system (e.g., a social media website) won't be able to recognize the individual from the digital photo. In the context of the physical world, a camera can take a photo in a portrait-shaped frame and send it to a machine-learning system. Then there is a possibility that the camera resolution quality is insufficient and it can smooth the image before sending to the AI application. This potentially destroys most adversarial perturbations and the photo of the perturbed adversarial examples stops being adversarial. Stated differently, a camera resolution may be poor and not be able to identify the adversarial changes on a real object (e.g., sunglasses with particular features that are intended to serve as an adversarial attack). When this picture is processed by an AI face recognition algorithm inside the camera, some adversarial attacks may not be effective because of the low-resolution processing of the camera. Thus, when an AI system in digital world is attacked, the pixels can be changed to exact values and be 100% sure that those changes will lead to attack. However, if an AI system is attacked in the physical world, no matter how the physical object is changed, there is a preprocessing step where AI system first makes a picture and then detects a face on this picture. The process of making a picture may change object properties on the picture (e.g., different color, angle, shadow, etc.,). Accordingly, adversarial attacks can occur in the physical and digital worlds.

In one embodiment, the goal submodule 214 identifies the category of the adversarial attack of the AI model. Categories of attacks on AI applications may depend on the goal of a malicious party (e.g., espionage, sabotage, fraud) and the stage of the ML pipeline (e.g., training and production). These categories include evasion, poisoning, and exploratory attacks. Evasion (adversarial example) is the most common attack on an AI application performed during production. It refers to designing an input, which is misclassified by AI applications, but appears normal to a human. For example, some pixels are changed in a picture before uploading, such that the image recognition system fails to classify the result correctly.

Exploratory attacks relate to privacy concerns. For example, an attacker may have a goal to explore an AI system, such as an AI application or training dataset, which can further come in handy in poisoning. A poisoning attack is a type of attack that takes advantage of an AI application during training. Poisoning can be considered one of the most widespread attacks against AI systems. Like evasion, poisoning attacks may vary in that they can target an AI application's availability and its integrity.

While poisoning, an attacker may have no access to a model and initial training dataset. Rather, an attacker may be limited to add new data to an existing training dataset or modify it. In trojaning, an attacker still may have no access to the initial training dataset but does have access to the model and its parameters, and can retrain this model.

In backdooring, an A application's behavior modification such as poisoning and trojaning is possible even in the black-box and grey-box environments along with the full white-box mode with an access to the model and training dataset. Nonetheless, the main goal in this example is not only to inject some additional behavior but to make the backdoor operate after the AI application retraining.

In some embodiments, the goal submodule identifies an attack subcategory. A subcategory is usually a subclass of a bigger category of attacks. For example, inference attacks may have different goals such as obtaining information about the AI application's parameters or training dataset. However, all have the general aim of gaining salient information. If two attacks differ in their approach but are united in goal, these attacks are grouped according to attack types.

Adversarial subcategories include evasion and adversarial reprogramming. In evasion, an input, which may seem normal to a human, is designed to mislead and be incorrectly classified by an AI application. In adversarial reprogramming, a victims AI system is used to run different (e.g., unauthorized) tasks.

Poisoning subcategories include: (i) label modification, (ii) data injection, (iii) data modification, and (iv) logic corruption. Adversarial attacks in label modification allow an adversarial party to modify solely the labels in supervised learning training datasets In data injection an adversarial party has no access to the training data as well as to the learning algorithm but has the ability to augment a new data to the training set. It is possible to corrupt the target model by inserting adversarial samples into the training dataset.

In data modification, an adversarial party has no access to the learning algorithm but has full access to the training data. The training data can be poisoned directly by modifying the data before it is used for training the target AI application.

In logic corruption, an adversarial party has the ability to meddle with the learning algorithm.

Inference subcategories include: (i) membership inference and attribute inference, (ii) input inference, and (iii) parameter inference. Membership inference is a less frequent type of attack, but is considered as a precursor for extracting data. Membership inference is an adversarial attack where a malicious party has a goal to determine whether a particular example is in a training dataset.

Input inference, or model inversion, is the most common adversarial attack type. Unlike the membership inference, where there is a potential to guess whether the example was in the training dataset, here it's possible to extract data from the training dataset. While dealing with images, a malicious party can net a certain image from the training dataset. For instance, knowing the name of a person allows finding his or her photo.

In parameter inference, sometimes referred to as model extraction, the goal is to identify the exact model or even its hyperparameters, such as a number of epochs, hidden layers learning rate, hidden units, activation functions, etc.

As discussed above, the goal configuration submodule 214 can identify the type of adversarial attack against an AI application. If two attacks belong to the same class and subclass, they may vary in approach (i.e., how an attack is performed). For evasion attacks, there are at least five different approaches to perform an attack: (i) optimization (OP), (ii) sensitivity (SA), (iii) geometric transformations (GT), (iv) generative models (GM), (v) and transferability (TR), each discussed in more detail below.

The OP type relates to adversarial attacks that use optimization methods to search for adversarial examples. Example methods are L-FBGS, DeepFool, PDG, C&W, etc.

The SA type relates to adversarial attacks that search for sensitive features of one input and modify them to generate adversarial examples. Although these adversarial attacks also use optimization methods, their objective is to determine sensitive features or directions of perturbations, and later use them to build an adversarial example. Examples include FGSM, JSMA, RSSA, BIM, Elastic-Net.

The GT category relates to adversarial attacks that explore natural and common perturbations. Adversarial attacks can be based on simple geometric transformations of images, measure the robustness of deep neural nets (DNNs) to geometric transformations and change the geometry of a scene, without altering the pixels.

The GM category relates to adversarial attacks that are based on generative models—a class of the machine learning algorithms that learn to estimate a probability distribution by looking at samples drawn from it. The AI application is used to produce artificial examples belonging to the same distribution.

The TR category relates to adversarial attacks that are based on transferability phenomenon that include different approaches (e.g., how to create a substitute model to be able to break the target AI application).

In various scenarios, a malicious party may have prior knowledge of an AI application, output, training dataset, and hyperparameters to launch an adversarial attack. In a white-box attack, the known data may include training data, DNN architecture, and hyperparameters. In this case a malicious party has extended knowledge of the DNN used (e.g., architecture, hyperparameters, weights, etc.), has access to the training data and knowledge about any defense mechanisms used (e.g., adversarial detection systems). Therefore, the malicious party has the ability to replicate the AI application under attack.

A grey-box attack refers to the knowledge of the network's architecture, the training data or some knowledge of the defenses employed (grey-box scenario). In this case, a malicious party can collect some information about the network's architecture (e.g., he or she may know that a certain model uses an open-source architecture), may know that the AI application under attack was trained using a certain training dataset, or has information about some defense mechanisms.

In a black-box attack, no data is known during an adversarial attack. In this case, an attacker has no knowledge about the model under attack. However, he or she has the ability to use the model (or a proxy of it) as an oracle. The attacker can supply limited inputs and collect output information.

Some AI applications can only be hacked by attacks with particular constraints. Method restrictions relate to the changes that can be performed against original data. For instance, for image recognition, fewer pixels are changed considerably or vice versa (e.g., slightly modifying as many pixels as possible).

Although the ways to define "imperceptible" (e.g., to a human) are task-dependent, most of them are based on an $l_p$ norm distance. As used herein, the $l_p$ norm distance is between two points x and x' in a high-dimension space. The l-infinity denotes the maximum change for all pixels in adversarial attack examples. In fact, attacks based on l-infinity norm (i.e., the maximum pixel difference) are more frequent and easier to perform. However, they are less transferable to real life, as the small changes can be offset by the quality of cameras. If a malicious party has a picture and makes small perturbations to multiple pixels thereon, that transformed picture can fool an AI application.

As used herein, $l_2$ measures the Euclidean distance between the adversarial attack example and the original sample. For example, an original sample may be an image that is being modified (e.g., to make a car look like a cat). In this example, an original sample is a car and an adversarial attack is the same car but with a camouflage that makes this car appear like a cat for AI the application. When p=1 (i.e., 11), the distance is equivalent to the sum of the absolute value of each dimension, which is also known as the Manhattan distance. When p=0 (i.e., $l_0$), the distance between two points measures the number of dimensions that have different values, such as the number of pixels changed in the adversarial attack examples.

In a perceptual adversarial similarity score (PASS) the adversarial example (AE) is misclassified by the AI applications, and visually recognized as a correct class. A structural similarity (SSIM) index as a metric to measure the similarity between two images. Luminance and contrast associated with the object structure are defined as the structure information of the image.

In one embodiment, the goal configuration submodule 214 can determine whether the adversarial attack is iterative or single step. Iterative attacks involve multiple iterations, such as, without limitation, BIM, DeepFool and others. Such adversarial attacks are more accurate but can be relatively slow. Single step adversarial attacks include one step, such as, without limitation, Fast Gradient Step Method (FGSM) or Reduced Space Searching Algorithm (RSSA). Single step adversarial attacks can be less accurate, but are typically fast.

The target configuration submodule 216 of the configurator module 210, is used to determine details of the target AI application. For example, the target configuration submodule 216 can determine the properties of AI application, including its goal. The more details about the AI application are identified, the more accurate of a defense strategy can be selected.

Different AI applications work with different types of data (e.g., images, audio files, etc.). Some adversarial attacks are object-independent and can be applied to any data, while others are specific to particular types of objects. For example, if a target AI application is related to face recognition, adversarial attacks can be specific to face properties. For example, the adversarial attack can change hair color perceived by the target AI application. These adversarial attacks may not be effective to voice activity detection, as they may be based on different properties. In this regard, FIG. 4B illustrates an example non-limiting table 400B of different types of data that can be identified by the target configuration submodule 216.

There are a wide range of AI applications, which help solve different tasks but involve the same type of object such as image data. By way of example, pose estimation applications can use different AI applications and activation functions. Depending on the properties, some adversarial attacks may or may not be effective. AI applications that can solve different tasks include, without limitation: face recognition, image classification, pose estimation, face detection, object detection, semantic segmentation, language processing, text classification, text recognition, sentiment analysis, question answering system, recommendation system, etc.

There are different categories of ML algorithms for various tasks, such as, without limitation, classification, clustering, regression, and others. Attacks on these categories of ML algorithms can be dissimilar. For example, in a classification ML algorithm, the goal is to identify subjects. Consider two sets of pictures classified by type (e.g., dogs and cats) and the purpose of the ML algorithm includes to be able to classify them automatically.

In regression (or prediction) ML algorithms, the knowledge about the existing data is used to predict a dependent variable value (y) based on a given independent variable (x).

The task of generative models differs from the abovementioned. Supervised learning tasks (classification and regression) deal with the existing information and associated decisions, whereas generative models are designed to simulate the actual data (not decisions) based on the previous decisions.

The most common unsupervised learning example is clustering, which is similar to classification, but with a salient difference, namely that the information about the classes of the data is unknown, and there is no knowledge whether this data can be classified.

Dimensionality reduction or generalization is used if there is a complex system with unlabeled data and many potential features. Clustering may not be able to be applied because typical methods restrict the number of features.

Reinforcement learning is an environment-driven approach. It provides an appropriate action to maximize a reward in a particular scenario. For example, consider a child learning the environment by trial and error.

There are different types of ML algorithms, such as, without limitation, a support vector machine (SVM), convolutional neural networks (CNN), recurrent neural network (RNN), k-nearest neighbors (KNN), etc. Some attacks can be applicable for multiple algorithms, but are usually specific.

Some adversarial attacks are specific to an activation function. For example, FGSM and adversarial attacks relate to differentiable loss functions while Houdini can fool a gradient-based learning machine by generating adversarial examples directly tailored for the task loss of interest be it combinatorial or non-differentiable.

The target metric submodule 216 of the configurator module 210, is used to compare the effectiveness of each defense. The metric submodule 216 may include model accuracy, F1 score, F2 score, false positive rate, false negative rate, false sensitivity, empirical robustness, Cross Lipschitz Extreme Value, as well as other options that can be used to compare the results of the effectiveness evaluation of the AI solutions.

Model accuracy is a performance measure based on a ratio of correctly predicted observation to the total observations. Precision is the ratio of correctly predicted positive observations to the total predicted positive observations. Recall (Sensitivity) is the ratio of correctly predicted positive observations to all observations in an actual class. True Positives (TP) are correctly predicted positive values. For example, the value of the actual class is "Yes" and the value of the predicted class is also positive. For instance, if the actual class value indicates that a particular passenger will survive, the predicted class indicates the same.

True Negatives (TN) are correctly predicted negative values. For example, the value of the actual class is "No" and the value of the predicted class is also negative. If the actual class indicates that this passenger will not survive, the predicted class indicates the same.

False positives (FP) and false negatives (FN) are results that occur when the actual class contradicts the predicted class. In FP, the actual class is "No" and the predicted class is "Yes." For example, the actual class indicates this passenger will not survive, but the predicted class indicates that this passenger will survive. In FN, the actual class is "Yes" but the predicted class in "No." For example, the actual class value indicates that this passenger will survive and the predicted class suggests otherwise (i.e., that the passenger will die).

The F1 score is the weighted average of precision and recall, discussed above. In one embodiment, the metric submodule 218 is operative to determine the empirical robustness of a classifier object over a sample x for a given adversarial attack. The empirical robustness is equivalent to computing the minimal perturbation that the malicious party introduces for a successful attack.

In one embodiment, the metric submodule 218 is operative to determine the Cross Lipschitz Extreme Value (CLEVER) to compute a score for an untargeted adversarial attack.

Classification Accuracy Variance (CAV) is a salient metric used to evaluate the performance of a deep learning (DL) model. Therefore, a defense-enhanced model can maintain the classification accuracy on normal testing examples as much as possible. In order to evaluate the impact of defenses on accuracy, we define CAV as provided by equation 1 below:

$$CAV = Acc(Fd, T) - Acc(F, T) \quad \text{(Eq. 1)}$$

Where Acc(F, T) denotes model F's accuracy on dataset T.

The Classification Rectify Ratio (CRR) relates to the percentage of testing examples that are misclassified by F previously but correctly classified by Fd. Inversely, Classification Sacrifice Ratio (CSR)—relates to the percentage of testing examples that are correctly classified by F but misclassified by Fd.

In one embodiment, the metric submodule 218 is operative to determine the Classification Confidence Variance (CCV) of an ML model. For example, although defense-enhanced models might not affect the accuracy performance, the prediction confidence of correctly classified examples may significantly decrease. To measure the confidence variance induced by defense-enhanced models, we define CCV as provided by equation 2 below:

$$CCV = 1nPni = 1|P(Xi)yi - Pd(Xi)yi| \quad \text{(Eq. 2)}$$

Where n<N is the number of examples correctly classified by both F and Fd.

In one embodiment, the metric submodule 218 is operative to determine the Classification Output Stability (COS). For example, to measure the COS between the original ML model and the defense-enhanced ML model, the metric submodule 218 can use Jensen-Shannon (JS) divergence to measure the similarity of their output probability. As to the Total Protection Score, the metric submodule 218 provides a combined value for all or a combination of relevant metrics.

As illustrated in FIG. 2, there is an assessment module 220 coupled to the configurator module 210. While testing multiple attacks and defenses, based on AI application properties, the assessment module 220 is configured to choose what kind of attacks and defenses should be evaluated. The assessment module 220 of the protection engine 200 identifies user AI application properties and the attacker goal properties. Based on these properties, the assessment module 220 chooses only an applicable list of attacks and defenses. For example, the applicable attacks are based on properties discussed previously, such as, whitebox or blackbox, image or voice, 10 or 1-2, targeted or non-targeted, etc. Upon determining, based on the properties, that a goal of the attack (e.g., blackbox attack) then the assessment module 220 solicits a database of attacks and choses only blackbox attacks, as these are applicable. In one embodiment, the assessment module 220 combines defenses and tests each defense against each attack, except those excluded by optimization. The assessment module 220 may include various sub-modules, such as pe-optimization 222, on-demand optimization 224, and post optimization 226, each discussed in more detail below.

The pre-optimization module 220 filters all attacks and defenses based on the type of AI application and the goal values of the AI application. As discussed previously, AI application values mean the properties of the AI application, such as AI object, ML category, ML algorithm, ML activation function, etc. The goal values related to the properties of the goal, such as, threat, specificity, perturbation, environment, etc. The pre-optimization module 220 cooperates with the knowledge base 250 coupled to an updater 230 coupled to the internet 260. As mentioned above, the knowledge database 250 represents at least one of the rules database 118, defense database 114, or vulnerability database 112 of FIG. 1. The knowledge database 250 may be updated at predetermined intervals automatically or upon a trigger event. For example, the knowledge database 250 can include content based on the latest research articles. The internal logic of the knowledge database 250 can be based on various predetermined rules, which can be extended. Each rule represents one piece of knowledge that can be describes and measured. For example, the optimization is based on the fact that new adversarial attacks are better than the previous ones if they are of the same type. Some attacks or defenses are more relevant to a particular task (e.g., face recognition) whereas other attacks or defenses are not.

By way of example, and not limitation, six rules of the assessment module 200 are described below. Consider Rule 1 to be related to the goal optimization. The first step of the pre-optimization sub-module 222 is to filter all attacks and defenses based on application and goal values. For example, the knowledge database 250 can provide a goal of the subject AI application being evaluated, the vulnerabilities associated with the subject AI application, and different defenses available against each of the vulnerabilities.

Consider Rule 2 to be related to using an adversarial attack mindmap. As used herein the term "mindmap" refers to an attack dependency tree. For example, a mindmap is similar to a genealogical tree, where each attack is presented as a child or parent of another attack. This rule only runs the latest and the most advanced attacks from the same attack tree. In one embodiment, the pre-optimization sub-module 222 runs an Iterative Fast Gradient Step Method (IFGSM)

instead of FGSM because IFGSM provides more accurate results. An example rule set is provided below:

Use RSSA attack instead of FGSM attack
Use DeepFool attack instead of L-BFGS attack
Use OptMargin attack instead of C&W attack Consider Rule 3 to be related to time optimization. For example, the pre-optimization submodule does not run attacks that take above a predetermined time threshold to run. Rule 3 can be tested on real examples to determine the length of time it takes for each attack, and hence, which attacks are the most time-consuming. The time-consuming attacks that are above a predetermined time threshold are avoided to be evaluated, thereby improving the performance of the computing device hosting the protection engine 200. An example rule set related to Rule 3 is provided below:

Delete L-BFGS attack
Delete C&W attack
Delete PGD attack

Consider Rule 4 to be related to specificity optimization. An example rule set related to Rule 4 is provided below:

If AI application=Face Recognition and AI environment is physical, run only JSMA attack as these pixels can be drawn on a real face.
If AI object=File, run only 10 and 11 attack.

In one embodiment, it is not required to test all attacks against our AI application with a particular protection, even after all pre-optimization, since the protection engine 200 discussed herein is interested in the most effective attacks (i.e., that cause most damage) according to the selected metrics. The on-demand optimization submodule 224 is operative to filter out attacks that deemed to be not effective. The time optimized set of attacks generation of the on-demand optimization submodule 224 operates by initially sorting out all attacks by the selected metrics for each combination of defenses and training datasets. This operation is discussed as Rule 5. After a predetermined number of steps (i.e., two steps in the present example, where a step is an action when running all attacks (that are left after all pre-optimizations and any other filtration discussed herein) at one dataset and one defense combination), the on-demand optimization submodule 224 identifies an attack with the worst metrics and excludes this attack from the comprehensive list of attacks (e.g., attacks related to the subject AI application and in the present assessment process), such that the deleted attack is not run by the protection engine 200. For example, a worst metric means the worst value according to selected metric. These metrics can be predetermined or assigned by a user. By default, there is an overall metric that is a combination of all existing metrics. The protection engine 200 takes two more steps, calculates metrics for these two steps and the previous ones, selects an attack with the worst metrics, and deletes it. As discussed previously, a step is an action when running all attacks at one dataset and one defense combination. Then, the protection engine 200 takes the next four steps, compares the metrics from eight steps (four new and four previous) and deletes an attack with the worst performance. The protection engine 200 continues the iterative process with 8 steps, 16 steps, 32 steps, and so on. In one embodiment of the present algorithm, the condition (an additional rule that prevents an effective attack from being excluded) is taken into consideration. For example, in the case where an attack takes the first place in any step, the protection engine 200 does not delete it even if it performs worse in other steps.

Consider Rule 6 to work for different datasets but in the opposite direction. For example, if there are a number of datasets and some of these datasets regularly perform better than others, for the next test the protection engine 200 does not run the datasets on which attacks do not perform well with respect to their metrics, and we choose only the worst datasets to check our defenses in the worst case scenario. As used herein, a worst dataset is a dataset where attacks have the best metrics.

In one embodiment, the assessment module 220 includes a post optimization submodule 226 operative to prepare data for AI-Enhanced assessment For example, the post optimization submodule 226 can save all attacks and defenses thereof that are left from such combination and then use them as a starting point for an AI-enhanced combinatory assessment.

In one embodiment, the protection engine 200 includes an AI enhanced assessment module 240 coupled to the assessment module 240. The AI enhanced assessment module 240 can be run upon completion of the operations of the assessment module 220 to identify a best combination of defenses for a subject AI application. To that end, the AI enhanced assessment module 240 may include various submodules, such as the solver preparer 242, solver runner 244, solver tester, 246, and solver filler 248, each described in more detail below.

Generally, the number of combinations of defenses, attacks, and datasets for testing can be large and pose a computational challenge. Accordingly, in one aspect of the present disclosure, not all defenses, attacks, and datasets are evaluated; rather, the protection engine 200 selects some of each that provide a maximum approximate coverage of all possible inputs. By way of example and not limitation, to determine the value of a function in any point of space, the protection engine 200 collects examples of this function at different points in the space and then applies (i.e., selects) the function that provides an approximate value based on the examples. Similarly, instead of running all defense combinations in all datasets with all hyperparameters, the protection engine 200 is configured to choose some of the, datasets, and defenses and hyperparameters with absolutely different values and then provide data (e.g., a set of inputs and outputs where input is a combination of defenses, on one dataset with particular AI application hyperparameters and output is metric values for each attack) to some optimization algorithm that will use examples of defense combinations and their attack metrics to predict metrics, which we will have by combining multiple defenses. All attacks (excluding those that are unnecessary according to the previous pre-processing and other steps) should be executed against each combination of defense, dataset, and AI application hyperparameters, to provide a resulting metrics, such that the input is a combination of defense, dataset, hyperparameters, and the output is a set of metrics describing the quality of this combination under all attacks. In our case, this algorithm is represented by solver runner submodule 244 of the AI enhanced assessment module 240.

The solver preparer submodule 242 of the AI enhanced assessment module 240 is operative to generate training data for the knowledge database 250 to evaluate a subject AI application. Since the solver runner submodule 244 has provided a list of defense combinations to be evaluated, the solver preparer submodule 242 generates test data representing different types of attacks to test the combination of defenses. Each record used for training is a result (group of metrics) of running the AI application with the chosen defenses with particular hyperparameters trained on the selected datasets and attacked by all the applicable attacks.

In one embodiment, instead of selecting and running all combinations of defenses, hyperparameters, and the dataset, the solver preparer submodule 242 randomly chooses a portion of defenses, model hyperparameters, and datasets. In various embodiments, the number of combinations N may be random, based on a fraction of the number of available combinations, and/or based on a computational capability of the computing device performing the present assessment (e.g., the more powerful the computing device, the higher the number N). In this way, the solver preparer submodule 242 creates a new training set of assessments (e.g., result metrics for particular defense/dataset/hyperparameters combination) that can be efficiently processed by the protection engine 200. These assessments are then used by the solver runner submodule 244.

The solver runner submodule 244 of the AI enhancement module 240 is configured to receive the set of attacks and combination of defenses thereof from the solver preparer submodule 242 to initiate training of the solution model, sometimes referred to herein as the AI model. Thus, the solver runner submodule 244 uses the training set consisting of defense/dataset/hyperparameter combinations and corresponding identified attack metrics that were formed by the solver preparer submodule 242, discussed above. The solution model is configured to approximate the function of metric results dependency, based on the defenses, its hyperparameters, and datasets chosen. The training of the solution model is based on the data received from the solver preparer submodule 242. Consequently, the solver runner submodule 244 finds a defense combination that has the best attacks metrics value for the defenses, datasets, AI application hyperparameters. In one embodiment, the solver runner submodule 244 uses a neural network model or logistic regression to perform the task of approximating the function of the attack metrics value based on the input parameters such as defenses, dataset, and hyperparameters.

The solver tester submodule 244 of the AI enhancement module 240 is configured to test the AI solution (e.g., AI model) presented by the solver runner submodule 244. For example, after the solver runner submodule 244 has found the potential combination of defenses, dataset, and hyperparameters that provide the best attack metric result. This metric result is then tested by the solver tester submodule 246 by launching attacks on the generated combination of defenses, datasets and hyperparameters to see if the solver runner submodule 244 generated true (e.g., accurate) prediction. Upon determining that the real results of running attacks on proposed set of defenses dataset and hyperparameters are similar (e.g., within a predetermined threshold percentage) to one provided by the solver runner submodule 244, the solver tester submodule 246 identifies the that the selected combination is appropriate for the subject AI application and that the AI solution is therefore successful.

In one embodiment, the AI enhanced assessment module 240 includes a solver filler submodule 248. For example, if the result generated by the solver tester submodule differ from the result generated directly by applying particular attacks against a proposed set of defenses, dataset, hyperparameters combination, the solver filler submodule 248 adds this counted result and the defense combinations that were used to generate it to the training data for the solver runner submodule 244, thereby further improving the accuracy of the protection engine 200.

In one embodiment, the solver filler submodule 248 adds additional data to the training set for the AI-enhanced assessment with the help of the solver preparer submodule 242. The amount of data generated by the solver preparer module may be defined with the help of a RetrainSize parameter. For example, by default, it equals to the amount of data prepared for the first solver runner submodule 244 launches during solver preparer submodule 242 stage (e.g., another 100 combinations).

The solver runner submodule 244 is retained one more time, and the solver filler submodule 248 checks the results once again. If the results are still different, the solver filler submodule 248 repeats the training procedure until satisfying results (i.e., within the predetermined threshold percentage difference between expected results and actual results) are achieved. These may still differ from the expected results by a predetermined delta parameter, sometimes referred to herein as the threshold percentage difference. For example, this delta parameter may be 1% by default but may be modified depending on the type of AI application and/or the computational resources of the computing device of the protection engine 200.

The training set generation in solver preparer submodule 242 may be the most time-consuming step in the algorithm to generate the AI model. A small training set is chosen to determine if solver runner submodule 244 completes the task with a given training set. If the given training set does not provide an output that has a difference with an expected result that is within a threshold tolerance, the training set is enlarged, iteratively, until successful results are obtained. Even in the worst-case scenario when each time solver runner is not able to find the best combination of defenses, dataset and hyperparameters, the solver filler submodule 248 will finally check all the existing combinations of defenses, dataset and hyperparameters until the solver filler submodule 248 identifies a result that is within the threshold tolerance with the expected result.

Accordingly, the AI enhanced assessment module 240 can identify available possible attacks against an AI application, as well as identify available defenses for the AI application. The pool of possible attacks is reduced to those that are most computationally efficient. Possible defenses against the reduced pool of possible attacks are identified. In one embodiment, the pool of defenses against the reduced pool of possible attacks is reduced. A combination of attacks and defenses is selected based on the reduced pool of possible attacks and defenses thereof. The effectiveness of each combination of defenses based on the selected combination of defenses is determined. The effectiveness of the remaining combination of defenses based on the non-selected available defenses to the previously selected attacks is approximated.

As mentioned previously, there is an updater module 230 coupled between the knowledge database 250 and the internet 260. The updater module 230 includes various submodules that facilitate different functions, as described herein. For example, the collector submodule 232 of the updater module 230 is operative to track various databases where knowledge material (e.g., publications, guidelines, test results, etc.,) are available, by way of various crawlers, including, without limitation, GitHub search, Arxiv.org search, and Google search for knowledge material.

In one embodiment, after new research is downloaded, a tagger 234 submodule of the updater module 230 automatically adds tags to this research. For example, tags can include various parameters provided earlier by a configurator (Defense configuration, Goal configuration, Target configuration, Metric configuration). The tagger submodule 234 may use the text classification algorithm based on the World2vec model in order to parse documents and tag them automatically. In one embodiment, if a research is labeled to have tags that are relevant, the document is sent to a human analyst to have the document analyzed.

In one embodiment, the updater module 230 includes a tester submodule 236. If a new research has code examples of adverse attacks, the system automatically downloads and tests them with the tester module 236 (e.g., on default datasets and models). If this attack is more effective with the same parameters than at least one of the previously known attacks) it automatically becomes added to our solution. If there are any issues, the information is provided to an analyst to see if this new research is worth implementing.

Example AI Model Implementation

With the foregoing description of a protection engine 200, it may be helpful to now provide an example AI-enhanced algorithm implementation. By way of example only, and not by way of limitation, consider three classification datasets chosen by a protection engine: MNIST, CIFAR, and ImageNet. There is only one set of hyperparameters for AI application so we don't test all AI Application hyperparameters so that the number of combinations is small. There are two defense categories: Adversarial Training and Modified Model, where the protection engine chooses three defenses in each category:

"protection1_1", "protection1_2", "protection1_3", (defenses form Adversarial Training category)
"protection2_1", "protection2_2", "protection2_3". (defenses form Modified Model category)

The protection engine selects six adversarial attacks (randomly in the present example, while it will be understood that other criteria can be used as well). For example, FGSM, DeepFool, C&W, BIM, JSMA, RSSA.

As for the metrics, it is Cross Lipschitz Extreme Value (CLEVER).

Also consider that for each defense category the protection engine chooses a largest number of combinations of defenses. This means that the protection engine 200 may include the following variants of defense in category 1:
no defense in this category
protection1_1
protection1_2
protection1_3

Accordingly, the protection engine may include the following variants of defense in category 2:
no defense in this category
protection2_1
protection2_2
protection2_3

Stated differently, there are 4*4=16 defense variants, which are to be tested against three datasets. This means there will be 16*3=48 combinations in total. We test it all under one set of AI application hyperparameters. These combinations of various defenses may take too long to test on a computational platform of the protection engine 200. First of all, the approach described herein generates only several combinations of defenses and datasets randomly so that each defense and dataset would be involved at least once, which provides a total of three combinations in our training set:
protection1_1+protection2_2+dataset 1
protection1_1+protection2_3+dataset 2
protection1_2+protection2_3+dataset 3

Accordingly, the AI enhanced assessment module 240 of the protection engine 200 runs Solver preparer submodule 242 for each defense, dataset, hyperparameters combination in training set and gets three sets of attack metrics results.

For protection1_1+protection2_2+dataset 1
CLEVER metric for FGSM attack=0.9
CLEVER metric for DeepFool attack=0.8
CLEVER metric for C&W attack=0.7
CLEVER metric for BIM attack=0.6
CLEVER metric for JSMA attack=0.5
CLEVER metric for RSSA attack=0.4
For protection1_1+protection2_3+dataset 2
CLEVER metric for FGSM attack=0.93
CLEVER metric for DeepFool attack=0.83
CLEVER metric for C&W attack=0.73
CLEVER metric for BIM attack=0.63
CLEVER metric for JSMA attack=0.53
CLEVER metric for RSSA attack=0.43
For protection1_2+protection2_3+dataset 1
CLEVER metric for FGSM attack=0.91
CLEVER metric for DeepFool attack=0.81
CLEVER metric for C&W attack=0.71
CLEVER metric for BIM attack=0.61
CLEVER metric for JSMA attack=0.51
CLEVER metric for RSSA attack=0.41

These three metrics with the corresponding sets of defenses and datasets are provided to the solver runner submodule 244 for training (e.g., the solver runner 244 can be represented as a neural network, logistic regression, or another machine learning algorithm). After that, the protection engine attempts to learn from this solver model the metrics for the remaining 48-3 defense and dataset combinations would be.

Consequently, the protection engine 200 suggests metrics for the remaining 45 combinations of defense that are left (that were not previously selected). Finally, the protection engine 200 chooses the combination of defenses and dataset and having the best metric and this combination will be the universal defense suitable for our AI application. Then we check it and see if this potential metric value equals to the metric value calculated by manual tests of this combination of attacks and defenses. For example, the assessment module 220 is run and attacks are executed on the AI solution with the selected defenses and dataset. If the results are within a predetermined threshold tolerance, the protection engine 103 concludes that the AI model for the subject AI application to be the appropriate one. Upon determining that the metric is not within a predetermined threshold tolerance, the protection engine 200 select additional (e.g., three) combinations from the dataset and runs the model once again. This process continues iteratively until a determination is made that the metric is within a predetermined threshold tolerance of an expected result.

Example Process

Figure 5:
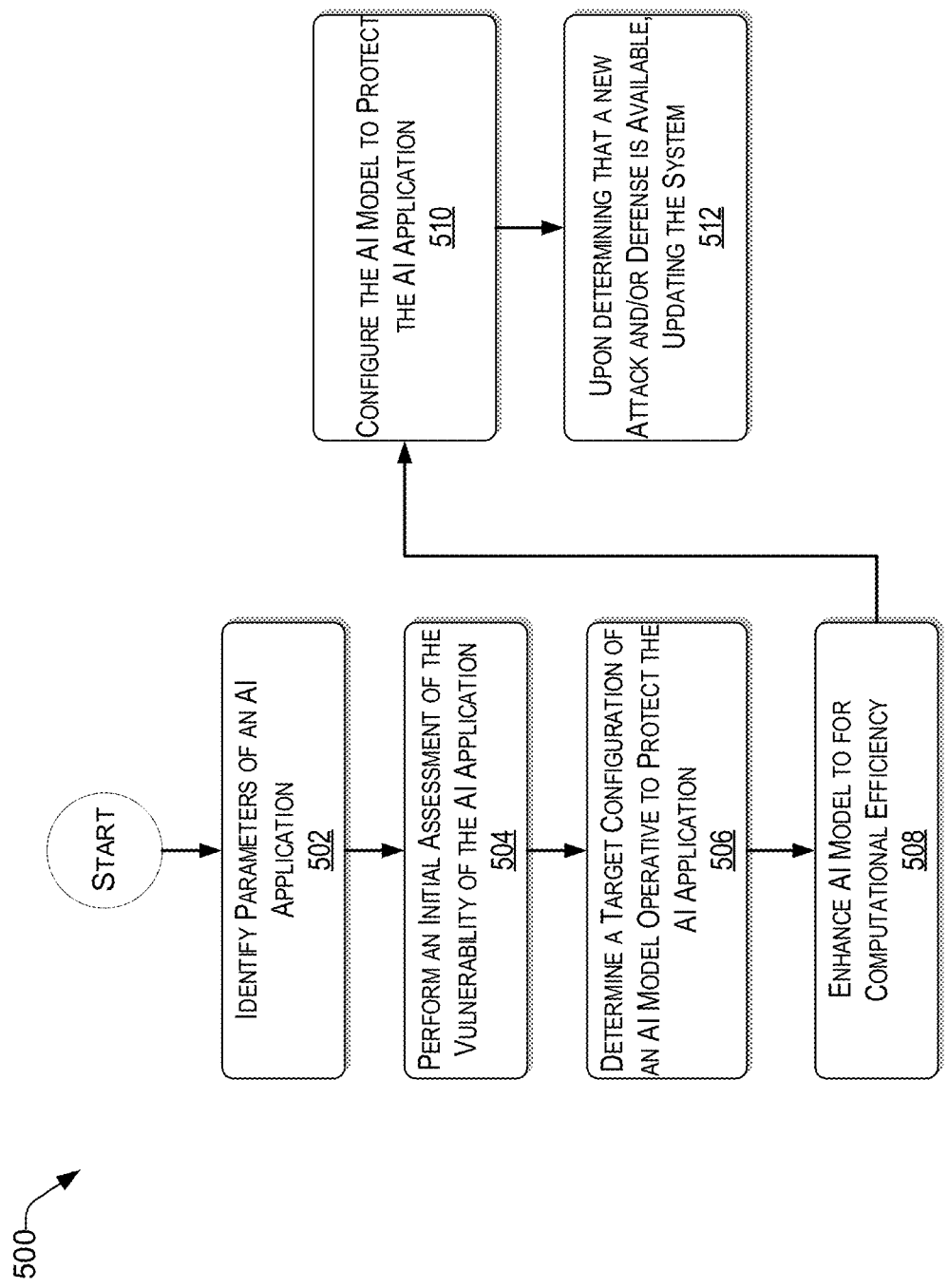
FIG. 5 presents an illustrative process of protecting an artificial intelligence application.

With the foregoing overview of the example architecture 100, conceptual block diagram of a protection engine 200, and example AI model implementation, it may be helpful now to consider a high-level discussion of an example process. To that end, FIG. 5 presents an illustrative process of protecting an AI application. Process 500 is illustrated as a collection of blocks in a logical flowchart, which represent sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 500 is described with reference to the architecture 100 of FIG. 1 and the protection engine 200 of FIG. 2.

At block 502, the protection engine 103 identifies parameters of the AI application. For example, the parameters of an AI application may include its goal, category, general parameters, and/or hyperparameters. The goal can be received by the protection engine as a digital data package from a computing device 110 of user, developer, or administrator 108 of the AI application. In other embodiments, the goal of an AI application 109 is automatically determined by the protection engine 103 or received from a rules database 118.

At block 504 the protection engine 103 performs an assessment of a vulnerability of the AI application by applying a combination of protection measures comprising two or more protection measures against at least two different attacks and at least one dataset. Further, the protection engine 103 determines whether the combination of protection measures is successful in defending the AI application against a combination of attacks, as discussed previously in the context of Rule 1. In various embodiments, the number of attacks in the combination of attacks can be optimized with mindmap (e.g., Rule 2), time optimization, (e.g., Rule 3) specificity optimization, (e.g., Rule 4), on demand attack optimization (e.g., Rule 5), and/or on demand dataset optimization (e.g., rule 6), each discussed in detail previously in the context of the discussion of the preoptimization submodule 222, and therefore not repeated here for brevity.

At block 506, the protection engine 103 determines a target configuration of an AI model to protect the AI application, based on the assessed vulnerability of the AI application. In various embodiments, the target configuration can be based on the goal of the AI model, metrics provided by the metric submodule 216 of FIG. 2, and/or defense category.

At block 508, the protection engine 103 enhances the AI model to comprise a combination of most computationally efficient defenses, based on the target configuration. For example, the AI enhanced assessment module 240 of FIG. 2 runs an algorithm that adjusts the machine learning techniques to choose the best (e.g., computationally efficient) combination of defenses according to the chosen metrics.

At block 510, the enhanced AI model is used to protect the AI application.

At block 512, upon determining that a new attack and/or defense is available, the method updated to include the new attack and/or defense. The new attacks and/or defenses thereof, including example code of each, can be harvested from various sources, such as the databases discussed herein and other public sources. In this way, an infrastructure of continuously improved and computationally efficient protection of the AI application is provided.

Example Computer Platform

Figure 6:
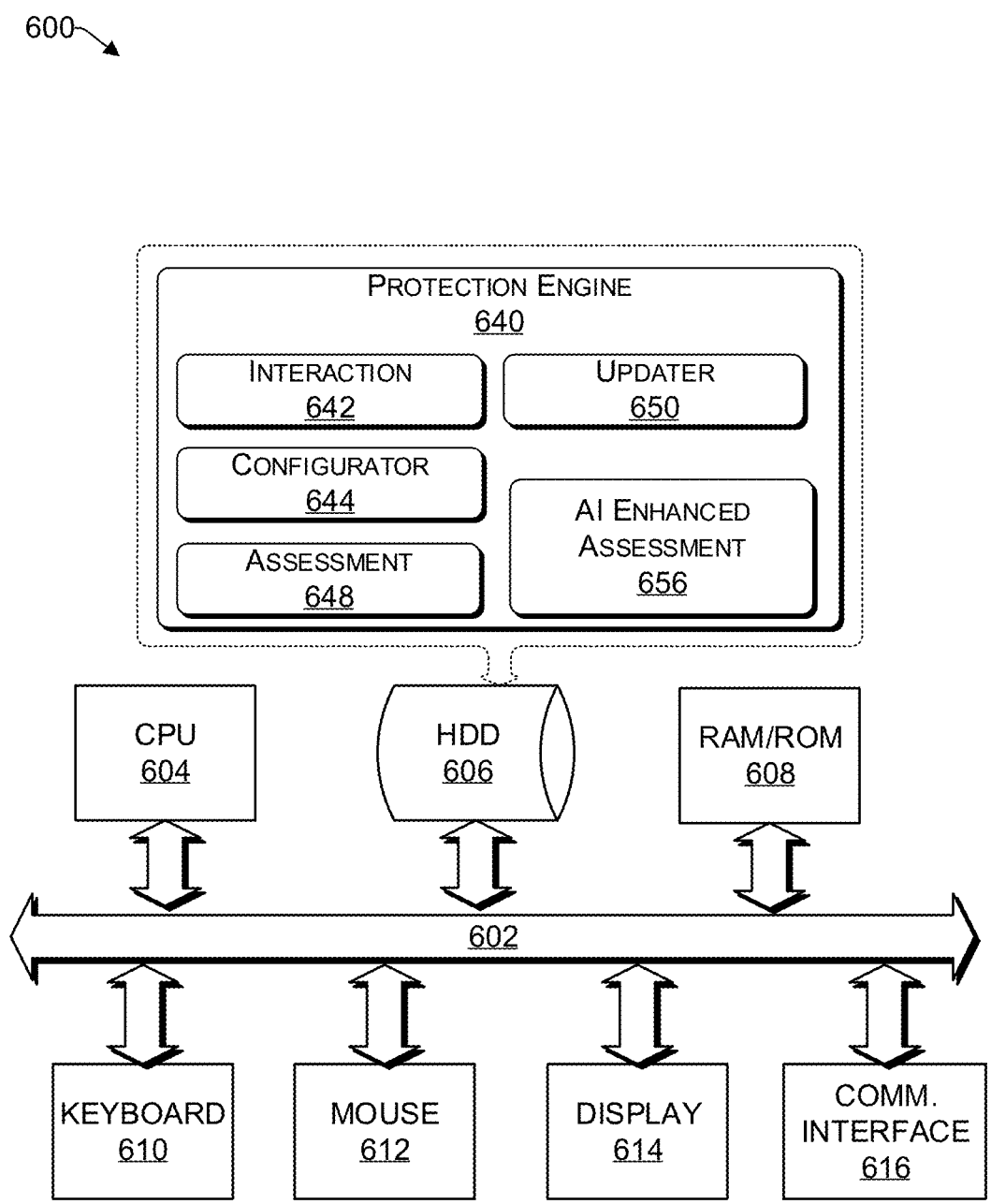
FIG. 6 provides a functional block diagram illustration of a computer hardware platform that can be used to implement a particularly configured computing device that can host a protection engine.

As discussed above, functions relating to protecting an AI application, can be performed with the use of one or more computing devices connected for data communication via wireless or wired communication, as shown in FIG. 1 and in accordance with the process 500 of FIG. 5. FIG. 6 provides a functional block diagram illustration of a computer hardware platform 600 that can be used to implement a particularly configured computing device that can host a protection engine 640. Accordingly, the computer hardware platform 600 is capable of communicating with a vulnerability database, defense database, rules database and other computing devices, as discussed herein. In particular, FIG. 6 illustrates a network or host computer platform 600, as may be used to implement an appropriately configured server, such as the AI protection server 116 of FIG. 1.

The computer platform 600 may include a central processing unit (CPU) 604, a hard disk drive (HDD) 606, random access memory (RAM) and/or read only memory (ROM) 608, a keyboard 610, a mouse 612, a display 614, and a communication interface 616, which are connected to a system bus 602. In some embodiments, the functions of the vulnerability database, defense database, and/or rules database are hosted by the computing device 600.

In one embodiment, the HDD 606, has capabilities that include storing a program that can execute various processes, such as the protection engine 640, in a manner described herein. The protection engine 640 may have various modules configured to perform different functions.

For example, there may be an interaction module 642 that is operative to receive electronic data from various sources, including the vulnerability database 112, defense database 114, and rules database 118. The protection engine 640 may also include a configurator assessment 648, updater, and AI enhanced assessment 656 modules. The modules of the protection engine 640 have been discussed previously and are therefore not repeated here for brevity.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method of protecting an artificial intelligence (AI) application, the method comprising:
    identifying parameters of the AI application;
    performing an assessment of a vulnerability of the AI application, comprising:
        applying a combination of protection measures comprising two or more protection measures against at least two different attacks and at least one dataset; and
        determining whether the combination of protection measures is successful in defending the AI application;
    determining a target configuration of an AI model to protect the AI application based on the assessed vulnerability of the AI application;
    determining a machine learning algorithm to adjust the AI model to include a combination of most computationally efficient defenses based on the target configuration; and
    using the adjusted AI model to protect the AI application.

2. The computer implemented method of claim 1, wherein, for each of the at least two different attacks, a goal of the attack is received from at least one of an administrator or user of the AI application.

3. The computer implemented method of claim 1, wherein the goal of the AI application is automatically determined by the computer by reviewing the AI application.

4. The computer implemented method of claim 1, wherein the goal of the AI application is received by the computer from at least one of an administrator or user of the AI application.

5. The computer implemented method of claim 1, wherein the target configuration is based on metrics of the ML model, including at least one of: accuracy, F1 score, F2 score, false positive rate, false negative rate, false sensitivity rate, empirical robustness, Cross Lipshitz Extreme Value (CLEVER) score, Misclassification Ratio (MR), Classification Rectify Ratio (CRR), Classification Sacrifice Ratio (CSR), Classification Confidence Variance (CCV), Classification Output Stability (COS), Average Confidence of Adversarial Class (ACAC), Average Confidence of True Class (ACTC), Average Lp Distortion (ALDp), Average Structural Similarity (ASS), Perturbation Sensitivity Distance (PSD), Noise Tolerance Estimation (NTE), Robustness to Gaussian Blur (RGB), or Robustness to Image Compression (RIC).

6. The computer implemented method of claim 1, further comprising, using a pre-optimization algorithm to optimize (i) a number of attacks and (ii) a number of defenses to be used in the combination of protection measures, based on at least one of a goal of the attack, a mindmap of the attack, and an expected time of the attack.

7. The computer implemented method of claim 1, further comprising, using an on-demand optimization algorithm to exclude an attack, a defense, or a dataset from the combination of protection measures, when the corresponding attack, defense, or dataset does not perform according to its corresponding metric.

8. The computer implemented method of claim 1, wherein the target configuration is based on a defense category of the AI model.

9. The computer implemented method of claim 1, further comprising updating the assessment of the vulnerability of the AI application by tracking one or more databases for documents of protection measures or defenses, by way of one or more crawlers.

10. The computer implemented method of claim 1, further comprising updating the assessment of the vulnerability of the AI application further by, for each document, tagging parameters of the document, including at least one of a defense configuration, goal configuration, target configuration, or metric configuration, by way of a text classification algorithm.

11. A non-transitory computer readable storage medium tangibly embodying a computer readable program code having computer readable instructions that, when executed, causes a computer device to carry out a method of protecting an artificial intelligence (AI) application, the method comprising:

identifying parameters of the AI application;
performing an assessment of a vulnerability of the AI application, comprising:
    applying a combination of protection measures comprising two or more protection measures against at least two different attacks and at least one dataset; and
    determining whether the combination of protection measures is successful in defending the AI application;
determining a target configuration of an AI model to protect the AI application based on the assessed vulnerability of the AI application;
using a pre-optimization algorithm to optimize a number of attacks and a number of defenses to be used in the combination of protection measures, based on at least one of a goal of the attack, a mindmap of the attack, and an expected time of the attack.

12. The computer implemented method of claim 11, further comprising:
    determining a machine learning algorithm to adjust the AI model to include a combination of most computationally efficient defenses based on the target configuration; and
    using the adjusted AI model to protect the AI application.

13. The computer implemented method of claim 11, wherein, for each of the at least two different attacks, a goal of the attack is received from at least one of an administrator or user of the AI application.

14. The computer implemented method of claim 11, wherein one or more properties of the AI application, including at least one of an AI object, a machine learning (ML) category, an ML algorithm, and an ML activation function of the AI application are automatically determined by the computer device by reviewing the AI application.

15. The computer implemented method of claim 11, wherein one or more properties of the AI application, including at least one of an AI object, a machine learning (ML) category, an ML algorithm, and an ML activation function of the AI application are received by the computer device from at least one of an administrator or user of the AI application.

16. The computer implemented method of claim 11, wherein the target configuration is based on metrics of the ML model, including at least one of: accuracy, F1 score, F2 score, false positive rate, false negative rate, false sensitivity rate, empirical robustness, Cross Lipshitz Extreme Value (CLEVER) score, Misclassification Ratio (MR), Classification Rectify Ratio (CRR), Classification Sacrifice Ratio (CSR), Classification Confidence Variance (CCV), Classification Output Stability (COS), Average Confidence of Adversarial Class (ACAC), Average Confidence of True Class (ACTC), Average Lp Distortion (ALDp), Average Structural Similarity (ASS), Perturbation Sensitivity Distance (PSD), Noise Tolerance Estimation (NTE), Robustness to Gaussian Blur (RGB), or Robustness to Image Compression (RIC).

17. The computer implemented method of claim 11, further comprising updating the assessment of the vulnerability of the AI application by tracking one or more databases for documents of protection measures or defenses, by way of one or more crawlers.

18. A computing device comprising:
a processor;
a storage device coupled to the processor;
a protection engine stored in the storage device, wherein an execution of the protection engine by the processor configures the computing device to perform acts comprising:
identifying parameters of an AI application;
performing an assessment of a vulnerability of the AI application, comprising:
    applying a combination of protection measures comprising two or more protection measures against at least two different attacks and at least one dataset; and
    determining whether the combination of protection measures is successful in defending the AI application;
determining a target configuration of an AI model to protect the AI application based on the assessed vulnerability of the AI application;
determining an AI enhanced algorithm to adjust the AI model to include a combination of most computationally efficient defenses based on the target configuration; and
using the adjusted AI model to protect the AI application.

* * * * *